(12) United States Patent
Ruz et al.

(10) Patent No.: US 7,591,124 B2
(45) Date of Patent: Sep. 22, 2009

(54) AUTOMATED SUPPLY SYSTEM FOR DELIVERY OF DIFFERENT PRODUCTS TO PACKAGING MECHANISM

(75) Inventors: Julio Ricardo Yan Ruz, Metepec (MX); Cesar Perez Monroy, Nicolas de Romero (MX)

(73) Assignee: Grupo Bimbo, S.A.B. de C.V., Mexico City (MX)

( * ) Notice: Subject to any disclaimer, the term of this patent is extended or adjusted under 35 U.S.C. 154(b) by 141 days.

(21) Appl. No.: 11/847,738

(22) Filed: Aug. 30, 2007

(65) Prior Publication Data

US 2008/0110723 A1 May 15, 2008

(30) Foreign Application Priority Data

Nov. 14, 2006 (MX) .................. PA/A/2006/013227

(51) Int. Cl.
*B65B 57/10* (2006.01)
*B65B 35/50* (2006.01)

(52) U.S. Cl. .............................. 53/535; 53/498; 53/447

(58) Field of Classification Search ..................... 53/58, 53/493, 498, 500, 152, 531, 535, 576; 198/456, 198/463.3, 431, 572, 575, 576; 99/356
See application file for complete search history.

(56) References Cited

U.S. PATENT DOCUMENTS

| | | | | |
|---|---|---|---|---|
| 3,119,213 A | * | 1/1964 | Kinney | 53/447 |
| 3,991,541 A | * | 11/1976 | Eijsermans | 53/526 |
| 4,902,184 A | * | 2/1990 | Fritz | 414/790.3 |
| 5,069,019 A | * | 12/1991 | Lodewegen | 53/443 |
| 5,127,212 A | * | 7/1992 | Johnsen et al. | 53/540 |
| 6,497,085 B2 | * | 12/2002 | Fukumoto et al. | 53/501 |
| 7,225,597 B1 | * | 6/2007 | Knoth | 53/246 |
| 2001/0025470 A1 | * | 10/2001 | Straub et al. | 53/540 |

* cited by examiner

Primary Examiner—Rinaldi I. Rada
Assistant Examiner—John Paradiso
(74) Attorney, Agent, or Firm—Fish & Richardson P.C.

(57) ABSTRACT

An automated supply system stacks and releases a selected number of products. The products are deposited from a conveyor into an arranging member and formed into a stack of a selected number of products. The stack of products is released into packaging. A product discharged from the conveyor is supported by a sliding base, which lowers when the next product on the conveyor is detected by a sensor. Once the sensor detects a selected number of products deposited onto the sliding base, the sliding base is retracted, dropping the stack of products into packaging. A retractable member is extended to collect products subsequently released from the conveyor while the sliding base is in the retracted position. The retractable member is retracted when the sliding base has extended and returned to an initial position.

9 Claims, 7 Drawing Sheets

AUTOMATED SUPPLY SYSTEM FOR DELIVERY OF DIFFERENT PRODUCTS TO PACKAGING MECHANISM

TECHNICAL FIELD

This disclosure relates to management, handling, and conditioning of different products. More specifically, this disclosure describes an automated system for collecting, arranging, and packaging a plurality of products.

BACKGROUND

Food and non-food products, whether granulated or non-granulated, may have different consistencies, shapes, dimensions, and sizes. Such products may be conditioned or packaged to preserve the products' physical and organoleptic properties. The conditioning and packaging also protects the products from environmental conditions, such as preventing contamination of the products' composition and appearance by humidity present in the environment. In addition, the packaging provides improved handling and transportation of the products to points of sale where the products may be purchased by the final consumers.

Dosing, grouping, and packaging of different food and non-food products, when performed by hand, can damage and contaminate the products. Additionally, such activities, when performed by hand, have high associated production costs due to the labor required.

Products to be packaged may also be transported by conveyors, and workers located along the sides of the conveyors may group, gather, or stack the selected number of products and subsequently introduce the grouped products into packaging, such as bags. Such an operation is very expensive as a result of the associated labor costs, and the product usually suffers structural damage as a result of the manual handling. Further, the products may be contaminated such as in the case of food products. For example, wavy products like corn toasts or similar products, which are very fragile, generally suffer high percentages of damaged or broken products, decreasing the quality and presentation of the packaged or pocketed products.

Some existing techniques deal with equipment, systems, and devices that automate piling up and aligning different products for pocketing (interchangeably referred to as "packaging"). Nevertheless, many of these techniques include a variety of parts that are very difficult to manufacture and incorporate highly complex systems and mechanisms.

OBJECTIVES OF THE INVENTION

An object of the present disclosure is to provide a continuous, automated supply system to package groups of products that have been previously stacked into a selected number.

Another objective of the present disclosure is to provide an automated supply system that packages products while preventing or substantially reducing product damage and the potential contamination of the product by eliminating the physical contact of the products with human hands.

Another objective of the present disclosure is to provide an automated supply system that quickly and efficiently packages products while also decreasing processing times and operating costs and increasing production and productivity.

An additional objective is to provide an automated supply system for packaging products while also counting the products prior to packaging.

Another objective is to provide an automated supply system for packaging products that is also structurally simple and cost effective.

Moreover, other objectives and advantages will be apparent from the description of this invention with reference to the referenced drawing figures.

SUMMARY

In general, an automated supply system includes a product input conveyor ("conveyor") with longitudinal guides distributed along the conveyor to guide and align the product while being transported on the conveyor. A sensor may be disposed at an end of the conveyor to count the products being transported by the conveyor, and an arranging member disposed at an end of the conveyor is operable to receive and stack the products. According to some implementations, a plurality of arranging members may be provided at an end of the conveyor. For example, the conveyor may transport products arranged in a plurality of rows, and a plurality of arranging members may be arranged at an end of the conveyor, each arranging member corresponding to a particular row of products formed on the conveyor. The automated supply system may also include a sliding base. The sliding base is positionable, such as in a vertical direction, permitting the arranging member to form a stack of products of a desired quantity. The arranging member may also include a first actuator operable to raise and lower the sliding base.

In operation, the sliding base receives the product. The sensor senses the presence of the product on the conveyor prior to placement onto the sliding base, and the first actuator lowers the sliding base in preparation for receiving the next product. The arranging member continues to receive products until a selected number of products have been stacked on the sliding base. Once the selected number of products are stacked, the sliding base retracts, releasing the stack of products into a package, such as a bag, provided below the arranging member. A retractable member, which may be provided on a side of the arranging member opposite the sliding base, extends to provide support to products moving off of the conveyor when the sliding base retracts to release the stack of products. The retractable member may be retracted and extended by a second actuator. After releasing the stack of products, the sliding base extends and moves upwardly to a starting position, and the retractable member is retracted. Any product supported by the retractable member is positioned onto the sliding base. The process may then be repeated.

The sliding base may be moveable along a vertical guide for positioning the sliding base along a vertical axis.

The first and second actuators may include, for example, pneumatic, hydraulic, electromechanical, or servomotor actuators.

According to some implementations, the sliding base may include one or more retractable pins. The retractable member may include one or more retractable pins.

According to some implementations, the arranging member may include a substantially cylindrically body having a plurality of vertical grooves through which the one or more pins of the sliding base and the one or more pins of the retractable member extend to support the products as the products are stacked.

In still other implementations, the sliding base may include a pair of opposing U-shaped members that abut to form a cylindrical body. Each U-shaped member may include a flange at a lower end that may be joined to an end of an articulated arm. Opposite ends of the articulated arms may be coupled to a support structure. The support structure may include a clinching actuator coupled to the first actuator. The clinching actuator is operable to separate opposing ends of the articulated arms, causing the U-shaped members to at least partially separate. As a result, the products accumulated in or otherwise supported by the cylindrical body are released. The U-shaped members may be retracted when a specified number of products have accumulated.

The automated supply system may also include an electronic control system to control and synchronize the operation of the automated supply system.

The automated supply system provides a fast, simple, and efficient automated stacking or piling process with improved operating performance, while significantly decreasing process times and operating costs.

The details of one or more implementations are set forth in the accompanying drawings and the description below. Other features, objects, and advantages will be apparent from the description and drawings, and from the claims.

DETAILED DESCRIPTION

Figure 1:
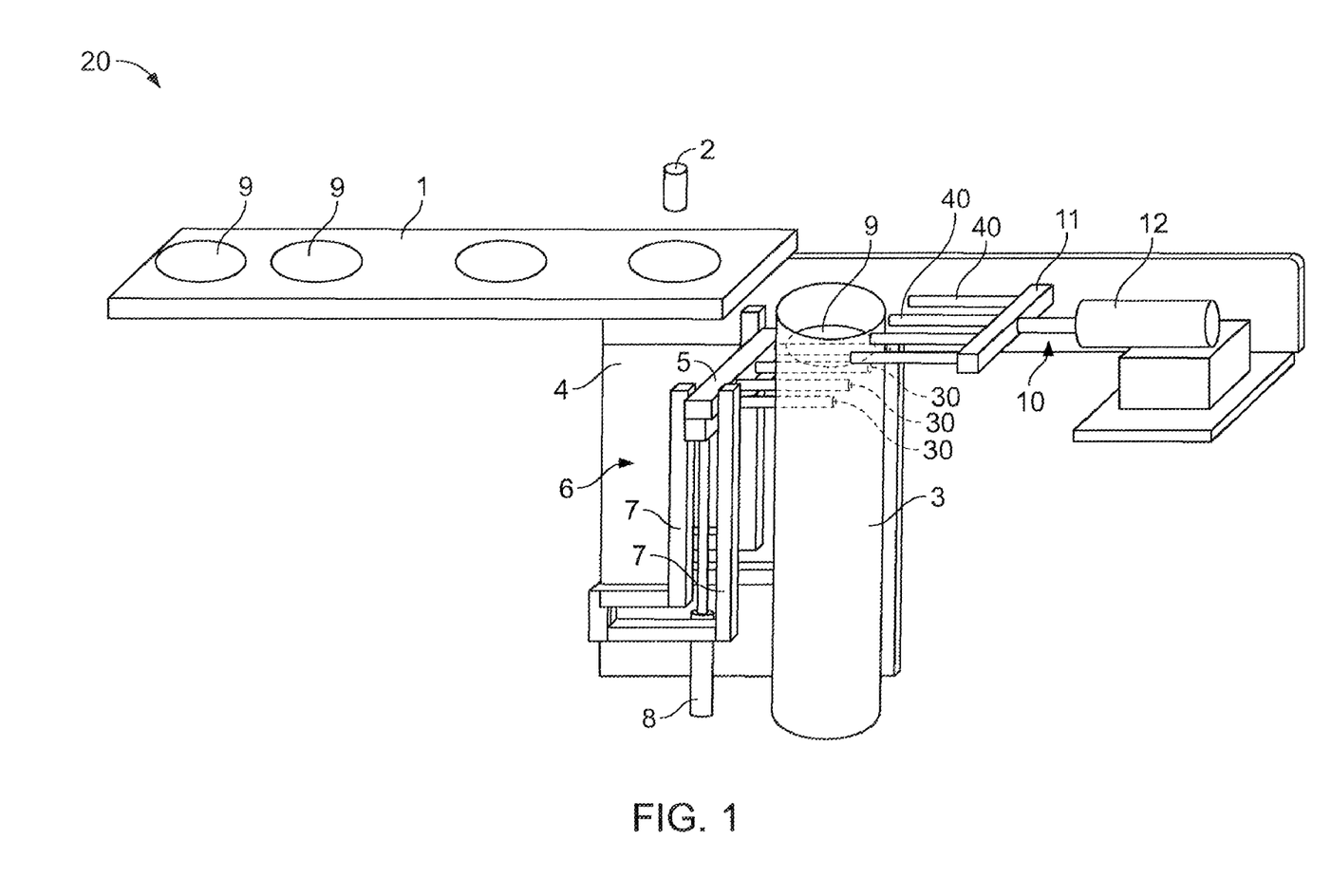
FIG. 1 is a perspective view of an automated supply system according to some implementations.
Figure 2:
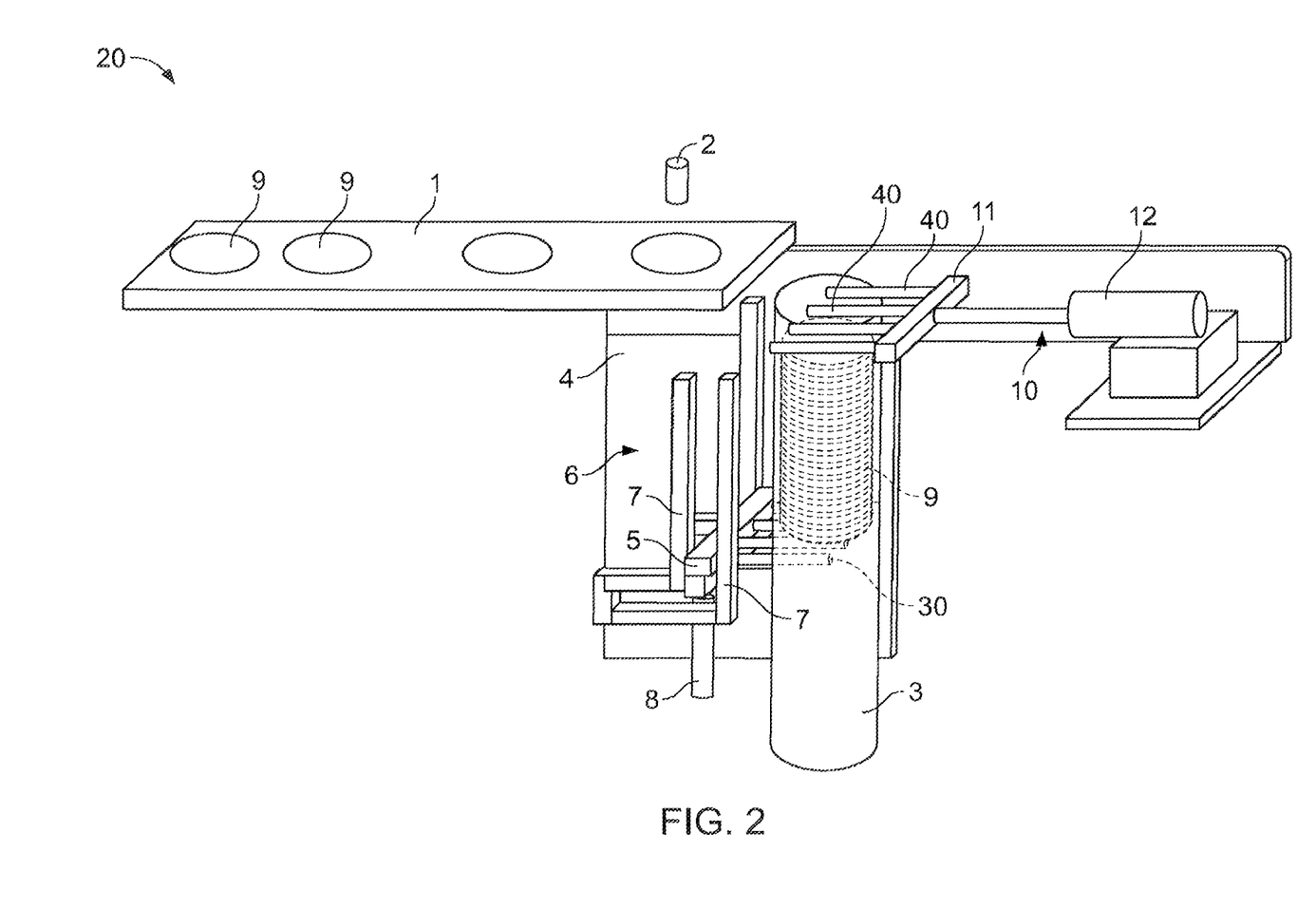
FIG. 2 is the automated supply system of FIG. 1 supporting a plurality of stacked products.

Referring to FIGS. 1 and 2, an automated supply system 20 includes a product conveyor 1 and a sensor 2 disposed above the product conveyor 1, operable to sense products 9 transported by the product conveyor 1. The product conveyor 1 transports the products 9 to an arranging member 3 secured to a structure 4. The arranging member 3 includes a plurality of vertical grooves (not shown). A holding member 5 of a sliding base 6 is disposed adjacent to the arranging member 3 and includes a plurality of pins 30 extending therefrom. The holding member 5 is actuated by an actuator 8, causing the holding member 5 to move along vertical guides 7 coupled to the support structure 4. When the holding member 5 is actuated by the first actuator 8, the pins 30 travel through vertical grooves formed in the arranging member 3.

The holding member 5 receives the products 9 after the products 9 leave the conveyor 1. The actuator 8 lowers the holding member 5 when the sensor 2 detects the next product 9 on the conveyor 1 to be deposited on the holding member 5. Once the holding member 5 is lowered, next product 9 is deposited onto the previous product 9, forming a stack of products 9. The products 9 may continue to be stacked until the stack includes a selected number of products 9.

The automated supply system 20 may also include a retractable member 10 disposed, for example, on a side of the arranging member 3 opposite to sliding base 6. The retractable member 10 includes a moveable base 11 having a plurality of pins 40 extending therefrom and an actuator 12 coupled to an end of the moveable base 11. The actuator 12 is operable to extend and retract the moveable base 11, causing the plurality of pins 40 to be inserted and removed, respectively, from grooves formed in the arranging member 3.

Figure 3:
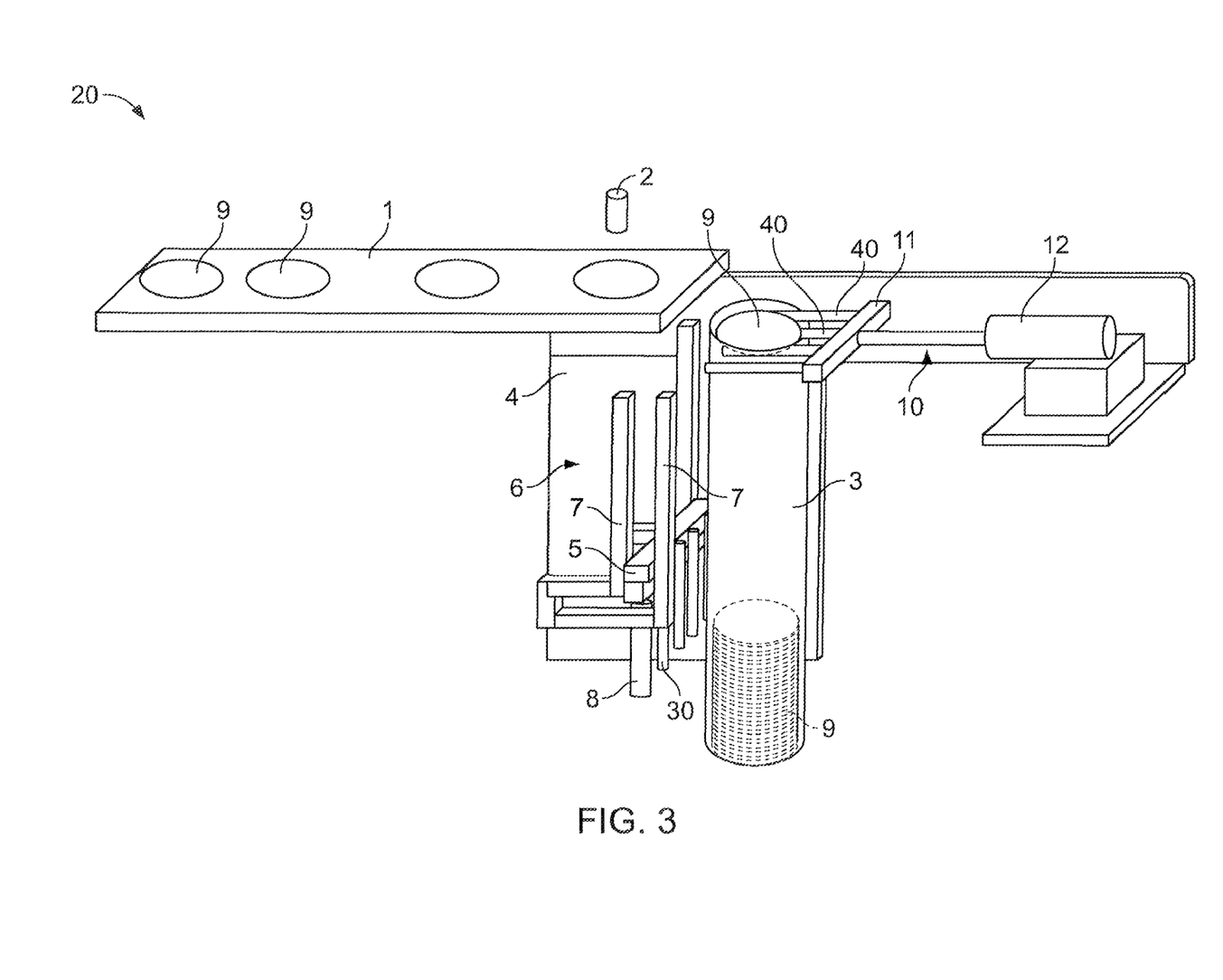
FIG. 3 is the automated supply system of FIG. 1 in which the sliding base is retracted, releasing the plurality of stacked products.

FIG. 3 shows the sliding base 6 in a retracted position that causes the stack of products 9 to drop. The sliding base 6 may be retraced when the stack of products 9 includes a selected number of products 9. According to one implementation, when the sliding base 6 is retracted, the pins 30 lower, releasing the products 9 towards a location where packaging, such as a bag, is provided. The actuator 12 extends the moveable base 11, causing the pins 40 to penetrate the grooves formed in the arranging member 3. As a result, products 9 subsequently delivered to the arranging member 3 by the conveyor 1 are supported by the moveable base 11.

Once the stack of products 9 is released from the sliding base 6, the sliding base 6 is re-extended, causing the pins 30 to penetrate the grooves formed in the arranging member 3. The actuator 8 then returns to the sliding base 6 to a raised position, and the actuator 12 retracts the moveable base 11 into the retracted position shown in FIG. 1.

Figure 4:
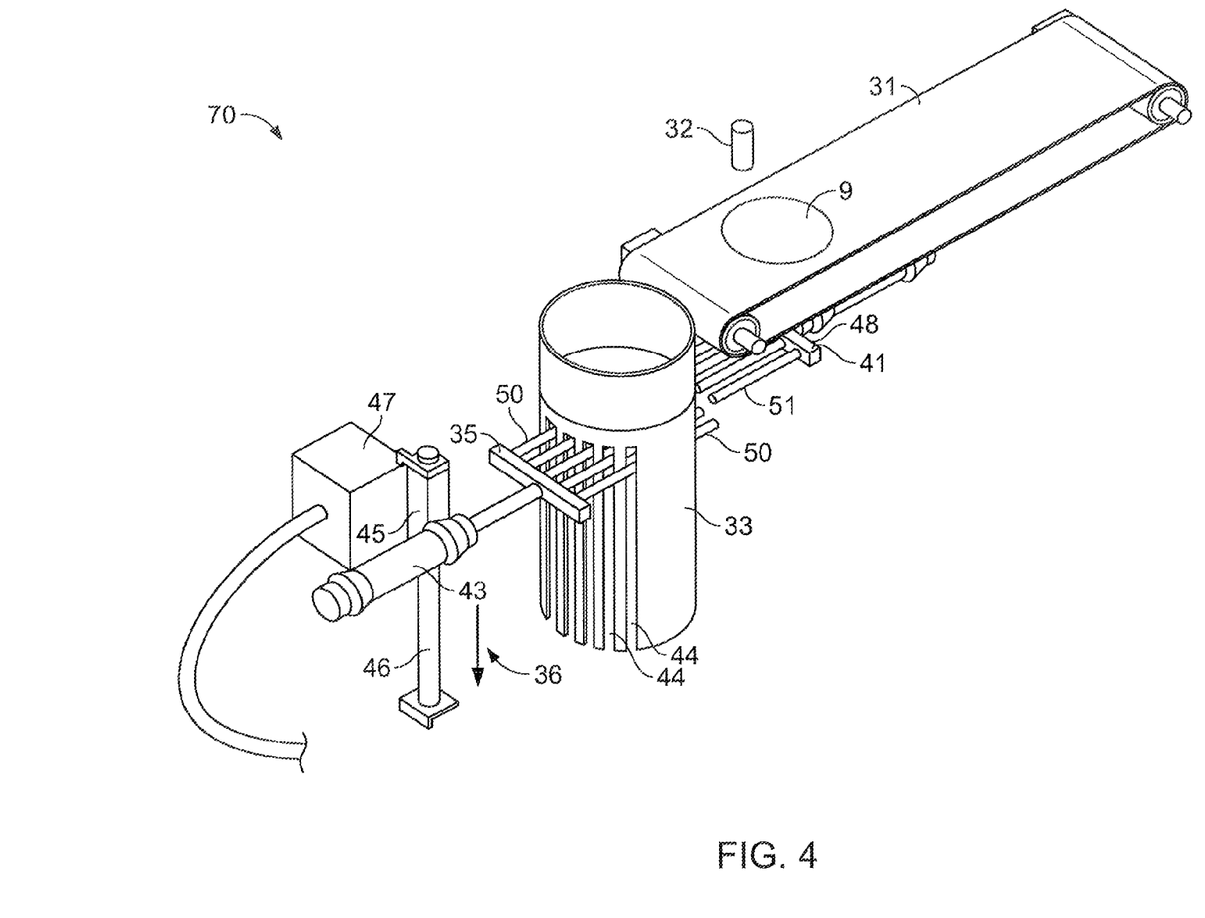
FIG. 4 is a perspective view of the automated supply system according to another implementation.

FIG. 4 illustrates a perspective view of the automated supply system 70 according to another implementation. As shown a retractable member 48 is disposed below the conveyor 31. A sliding base 36 is disposed at an end of and facing the conveyor 31. A holding member 35 is connected to an actuator 43 that is operable to extend and retract the holding member 35. When the holding member 35 is extended, pins 50 are inserted through a plurality of grooves 44 formed in an arranging member 33. The actuator 43 is coupled to a body 45, and a servomotor 47 is operable to position the body along a vertical guide 46.

Figure 6:
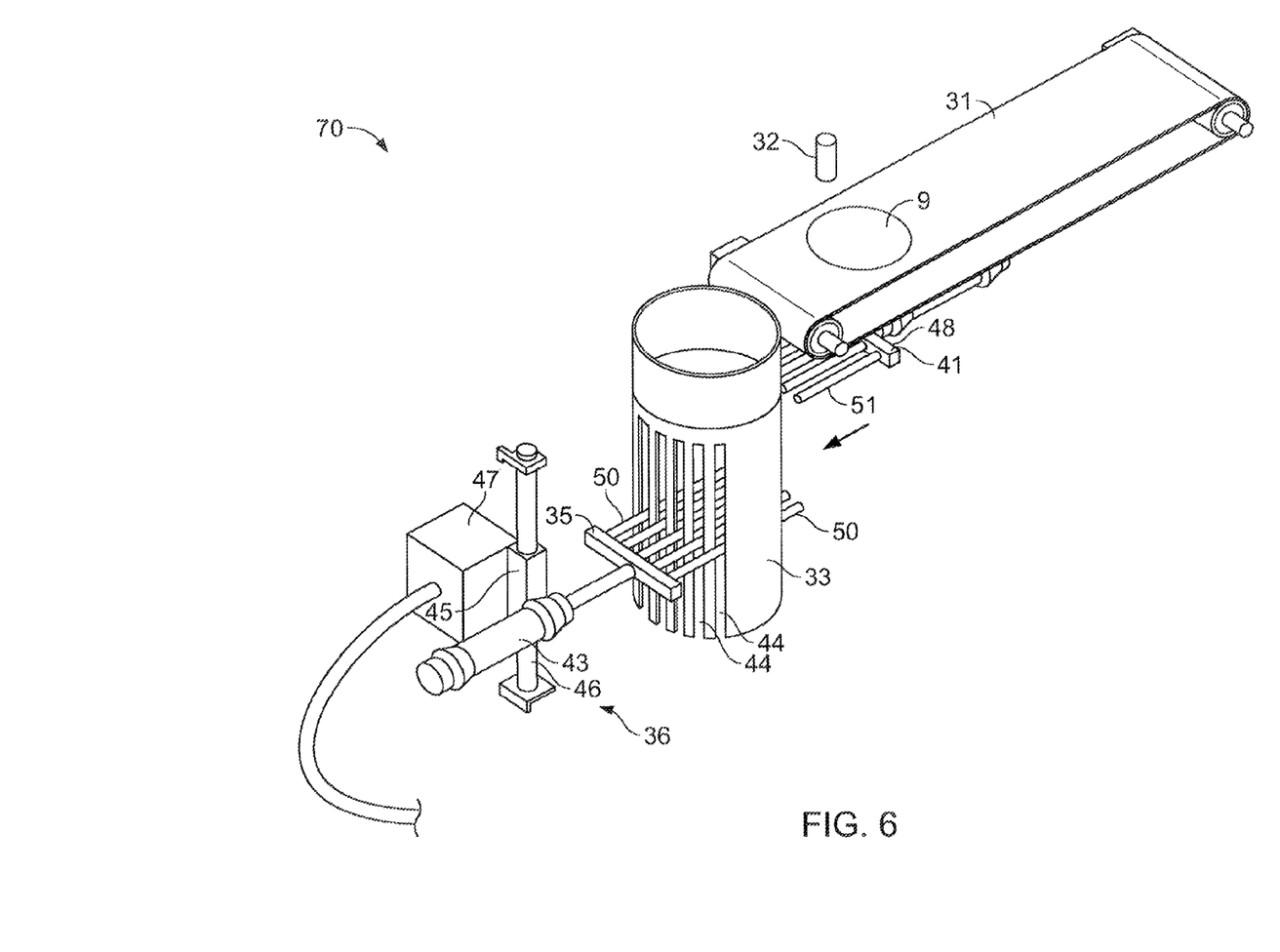
FIG. 6 is the automated supply system of FIG. 4 in which a holding member is at a lowered position and is indicated as being retracted, and a moveable base is indicated as being extended.
Figure 7:
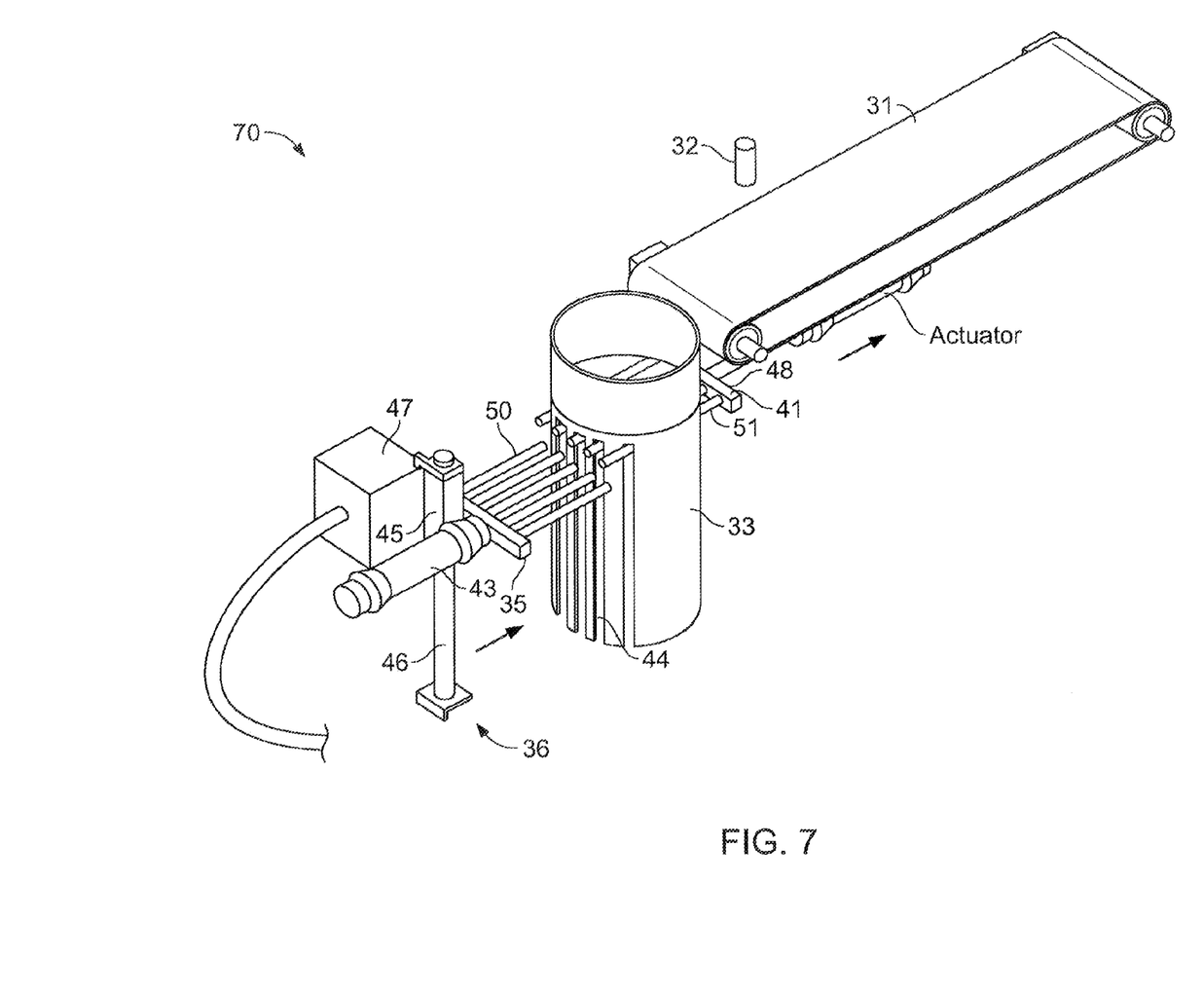
FIG. 7 is the automated supply system of FIG. 4 in which the holding member is shown at a raised position and indicated as being extended, and the moveable base is indicated as being retracted.

The servomotor 47 is operable to lower the holding member 35 after a product 9 is deposited thereon from the conveyor 31. Thus, once a product 9 is deposited onto the holding member, 35, the servomotor 47 lowers the holding member 35, for example, once the sensor 32 senses the next product 9 located on the conveyor 31. The action is repeated until a selected number of products 9 form a stack on the holding member 35, at which point the actuator 43 retracts, withdrawing the pins 50 of the holding member 35 from the arranging member 33, as shown in FIG. 6. As a result, the stack of products 9 formed in the arranging member 33 are dropped. The retraction of the holding member 35 is performed in synchronization with the extension of the retractable member 48. When the retractable member 48 is extended, pins 51 of a moveable base 41 enter into the grooves 44 formed in the arranging member 33, supporting products 9 deposited by the conveyor 31 while the holding member 35 is releasing the stack of product 9 and returning to a raised position. Once the holding member 35 has returned to the raised position, the moveable base 41 is retracted, as shown in FIG. 7. The operation may be repeated any number of times.

The arranging member 3, 33 may be in the shape of the products the arranging member 3, 33 is used to stack. For example, as shown in FIGS. 1-4, the arranging member 3, 33 is cylindrical with grooves formed therein to assist stacking of circular products 9. Additionally, a lower end of the arranging member 3, 33 may assist in opening bags into which the stack of products 9 arranged in the arranging member 3 are deposited, such as when a selected number of products 9 have been stacked.

According to some implementations, the automated supply system 20, 70 is operable to secure and open a package into which products are to be deposited, such as a bag (e.g., a preformed bag), each time a stack of products 9 includes a selected number of products 9. The bag may be secured and opened by an actuator, such as a pneumatic or electric actuator.

Figure 5:
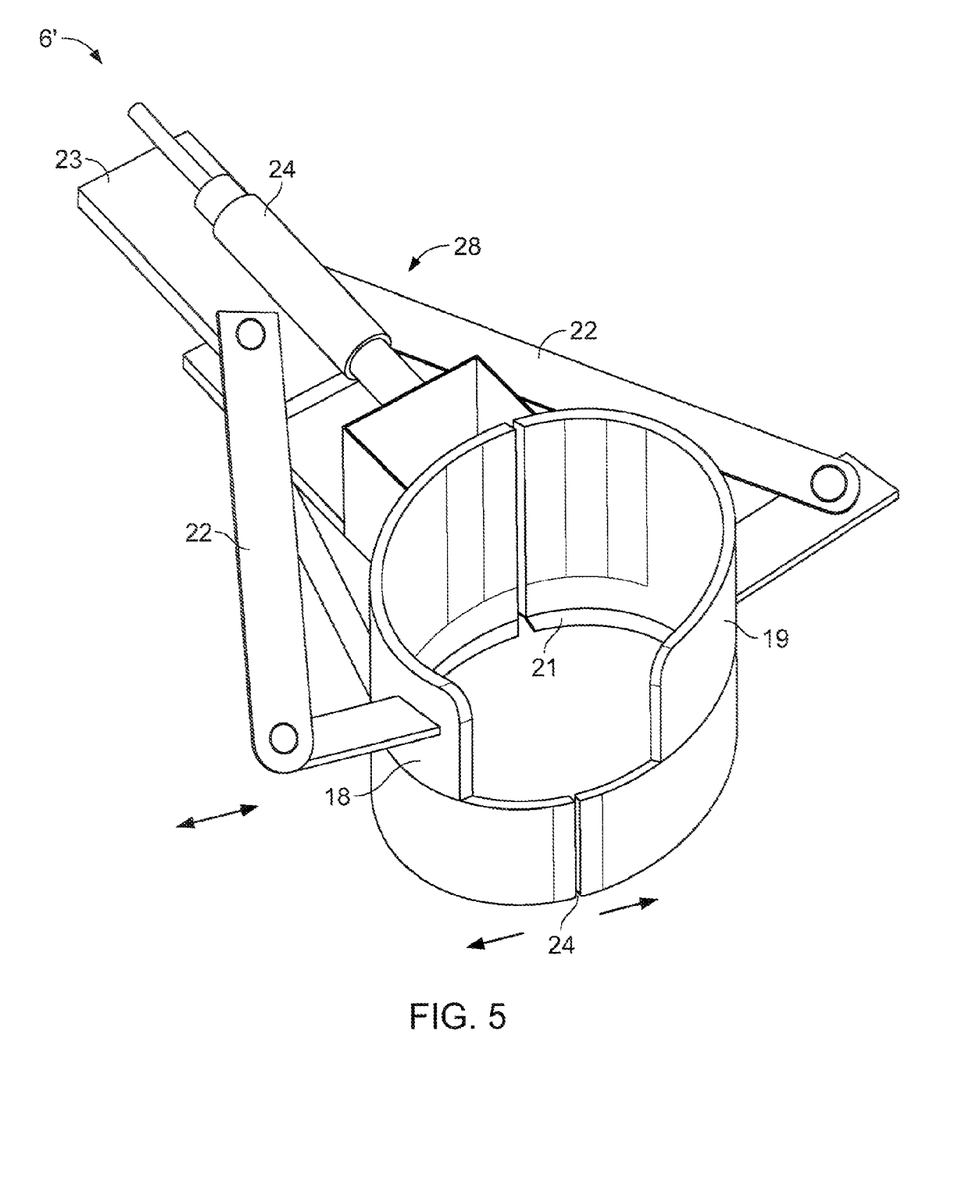
FIG. 5 shows a detail view of a sliding base including U-shaped members in a closed or abutting configuration according to some implementations.

FIG. 5 shows another implementation of the sliding base 6'. The sliding base 6' includes a pair of U-shaped members 18 and 19 that abut to form a cylindrical body 28. Each U-shaped member may include an inwardly disposed flange 21 at a lower end of members 18 and 19. The sliding base 6' also includes a pair of articulated arms 22. Each of the articulated arms 22 is attached to one of the U-shaped members 18, 19 at a first end and a support structure 23 at a second end. The supporting structure 23 includes an actuator 24 secured to a mechanism (not shown) for lifting and lowering the sliding base 6'. The actuator 24 is operable to retract the supporting structure, causing the articulated arms 22 to at least partially separate the U-shaped members 18 and 19. Consequently, any products 9 supported by the U-shaped members 18, 19, such as by the flanges 21, are released. Thus, the sliding base 6' may be operable to release the products 9 when a stack of products 9 of a selected number have been accumulated.

Additionally, the automated supply system 20, 70 may also include a software-assisted electronic control system operable to control and synchronize operation of the different components of the automated supply system 20.

A number of implementations have been described. Nevertheless, it will be understood that various modifications may be made without departing from the spirit and scope of the disclosure. Accordingly, other implementations are within the scope of the following claims.

What is claimed is:

1. An automated supply system for stacking and releasing a plurality of products comprising:
   a conveyor operable to convey the plurality of products;
   a sensor disposed adjacent to the conveyor and operable to detect the products on the conveyor;
   an arranging member disposed at or near an end of the conveyor and operable to arrange a selected number of the products in a stack, the arranging member comprising a cylindrical body with a plurality of longitudinal slots therein;
   a sliding base disposed at or near an end of the conveyor operable to receive the products deposited by the conveyor and to change position when the sensor detects the products on the conveyor; and
   a retractable member disposed adjacent to the arranging member and extendable through one or more of the slots in the arranging member to collect the products deposited into the arranging member by the conveyor.

2. The system of claim 1, wherein the sliding base comprises:
   a holding member extendable through one or more of the slots in the arranging member;
   a first actuator operable to position the holding member along a first axis; and
   a second actuator operable to extend and retract the holding member to and from the arranging member.

3. The system of claim 1, wherein the first and second actuators are selected from the group consisting of pneumatic, hydraulic, electromechanical, and servomotor actuators.

4. The system of claim 1 further comprising a controller operable to control operations of the system.

5. The system of claim 1, wherein the sliding base and the retractable member are disposed adjacent to the arranging member.

6. The system according to claim 5, wherein the sliding base and the retractable member are disposed on opposite sides of the arranging member.

7. The system of claim 1, wherein the sliding base comprises a plurality of freely extending members that are extendable into one or more of the slots in the arranging member.

8. The system of claim 1, wherein the retractable member comprises a plurality of freely extending members that are extendable into one or more of the slots in the arranging member.

9. The system of claim 1, wherein the arranging member comprises a pair of U-shaped members that abut to form a cylinder and forms a part of the sliding base and wherein the sliding base further comprises:
   a flange formed at or near a first end of the U-shaped members;
   a supporting structure;
   an articulated arm extending between each U-shaped member and the support structure; and
   an actuator operable to separate the U-shaped members.

* * * * *

UNITED STATES PATENT AND TRADEMARK OFFICE
CERTIFICATE OF CORRECTION

PATENT NO.         : 7,591,124 B2                                      Page 1 of 1
APPLICATION NO.    : 11/847738
DATED              : September 22, 2009
INVENTOR(S)        : Julio Ricardo Yan Ruz It is certified that error appears in the above-identified patent and that said Letters Patent is hereby corrected as shown below:

In col. 4, line 29, delete "shown a" and insert -- shown, a --, therefor.

In col. 6, line 15, delete "claim 1," and insert -- claim 2, --, therefor.

Signed and Sealed this
Seventeenth Day of April, 2012

David J. Kappos
*Director of the United States Patent and Trademark Office*